(12) United States Patent
Reinsberg et al.

(10) Patent No.: US 12,405,925 B2
(45) Date of Patent: *Sep. 2, 2025

(54) DECENTRALIZED DATABASE ASSOCIATING PUBLIC KEYS AND COMMUNICATIONS ADDRESSES

(71) Applicant: CELO FOUNDATION, San Francisco, CA (US)

(72) Inventors: Rene Reinsberg, San Francisco, CA (US); Sepandar Kamvar, San Francisco, CA (US); Marek Olszewski, San Francisco, CA (US)

(73) Assignee: CELO FOUNDATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,834

(22) Filed: Feb. 13, 2024

(65) Prior Publication Data

US 2024/0264983 A1    Aug. 8, 2024

Related U.S. Application Data

(63) Continuation of application No. 17/391,826, filed on Aug. 2, 2021, now Pat. No. 11,899,629, which is a
(Continued)

(51) Int. Cl.
*G06F 17/30* (2006.01)
*G06F 16/18* (2019.01)
(Continued)

(52) U.S. Cl.
CPC ...... *G06F 16/1834* (2019.01); *G06F 16/1805* (2019.01); *G06F 16/1824* (2019.01);
(Continued)

(58) Field of Classification Search
CPC ........ G06F 16/13; G06F 16/24; G06F 16/156; G06F 3/1297; G06N 3/00; G06N 5/00;
(Continued)

(56) References Cited

U.S. PATENT DOCUMENTS 9,300,466 B2    3/2016   Sakumoto
9,875,510 B1 *  1/2018   Kasper .................. G06Q 40/12
(Continued)

OTHER PUBLICATIONS

International Search Report and Written Opinion for Application No. PCT/US18/64931, date of mailing Mar. 27, 2019, 13 pages.
(Continued)

*Primary Examiner* — Hung D Le
(74) *Attorney, Agent, or Firm* — Butzel Long

(57) ABSTRACT

Systems and techniques are provided for a decentralized database associating public keys and communications addresses. A signed secret message may be sent by a validator computing device of a peer-to-peer network for a decentralized database to a communications address from a request for verification entry in a verification queue of the decentralized database. A second request for verification including the communications address and a user-signed secret message may be received. The user-signed secret message may be verified using a public key from the request for verification entry in the verification queue. The communications address and public key may be written to a verified database of the decentralized database when verifying the user-signed secret message causes a number of user-signed secret messages received in requests for verification with the communications address and successfully verified to meet a threshold number.

20 Claims, 12 Drawing Sheets

Related U.S. Application Data continuation of application No. 16/216,007, filed on Dec. 11, 2018, now Pat. No. 11,080,246.

(60) Provisional application No. 62/597,052, filed on Dec. 11, 2017.

(51) Int. Cl.

| | | |
|---|---|---|
| *G06F 16/182* | (2019.01) | |
| *H04L 9/06* | (2006.01) | |
| *H04L 9/08* | (2006.01) | |
| *H04L 9/32* | (2006.01) | |
| *H04L 9/00* | (2022.01) | |

(52) U.S. Cl.
CPC .......... *H04L 9/0643* (2013.01); *H04L 9/0819* (2013.01); *H04L 9/3239* (2013.01); *H04L 9/3247* (2013.01); *H04L 9/3255* (2013.01); *H04L 9/3297* (2013.01); *H04L 9/50* (2022.05); *H04L 2209/56* (2013.01)

(58) Field of Classification Search
CPC ....... G05B 13/00; H03M 7/30; H04N 9/8042; G06T 9/00
See application file for complete search history.

(56) References Cited

U.S. PATENT DOCUMENTS

| | | | |
|---|---|---|---|
| 12,088,541 B1 * | 9/2024 | Kheit | ................... H04L 51/046 |
| 2002/0095454 A1 | 7/2002 | Reed | |
| 2003/0065920 A1 | 4/2003 | Benantar | |
| 2005/0114367 A1 | 5/2005 | Serebrennikov | |
| 2011/0197061 A1 | 8/2011 | Chou | |
| 2014/0089668 A1 | 3/2014 | Sakumoto | |
| 2014/0244998 A1 * | 8/2014 | Amenedo | ............. H04L 63/126 |
| | | | 713/156 |
| 2016/0080380 A1 | 3/2016 | Dawoud Shenouda Dawoud | |
| 2016/0203522 A1 * | 7/2016 | Shiffert | ............. G06Q 30/0267 |
| | | | 705/14.58 |
| 2017/0180128 A1 | 6/2017 | Lu | |
| 2017/0317997 A1 | 11/2017 | Smith | |
| 2017/0330179 A1 | 11/2017 | Song | |
| 2018/0234413 A1 | 8/2018 | Watanabe | |
| 2019/0207912 A1 | 7/2019 | Nielson | |
| 2019/0280858 A1 | 9/2019 | Cambou | |

OTHER PUBLICATIONS

International Preliminary Report on Patentability for App No. PCT/US2018/064931, mailing date Jun. 25, 2020, 12 pages.

* cited by examiner

DECENTRALIZED DATABASE ASSOCIATING PUBLIC KEYS AND COMMUNICATIONS ADDRESSES

BACKGROUND

Public key encryption schemes may use Certificate Authorities (CAs) or key servers for key management. CAs may need to rely on trusted third parties to ensure the accuracy of associations between stored public keys and the identity of the party to whom the public keys belong. Key server may provide no mechanism that may be used reliably verify the accuracy of associations between stored public keys and the identity of the party to whom the public keys belong. It may difficult to do an inventory of all public keys stored using either CAs or key servers. An identity-based encryption scheme, in which an indication of the identity of a party, such as an email address, may be used as the public key for that party, may require the use of trusted third party to operate a private key generator (PKG).

BRIEF SUMMARY

In an implementation, a secret message may be sent by a validator computing device of a peer-to-peer network for a decentralized database to a communications address from a request for verification entry in a verification queue of the decentralized database. A second request for verification including the communications address and a signed secret message may be received. The signed secret message may be verified using a public key from the request for verification entry in the verification queue. The communications address and public key may be written to a verified database of the decentralized database when verifying the signed secret message causes a number of signed secret messages received in requests for verification with the communications address and successfully verified to meet a threshold number.

Systems and techniques disclosed herein may allow for a decentralized database associating public keys and communications addresses. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
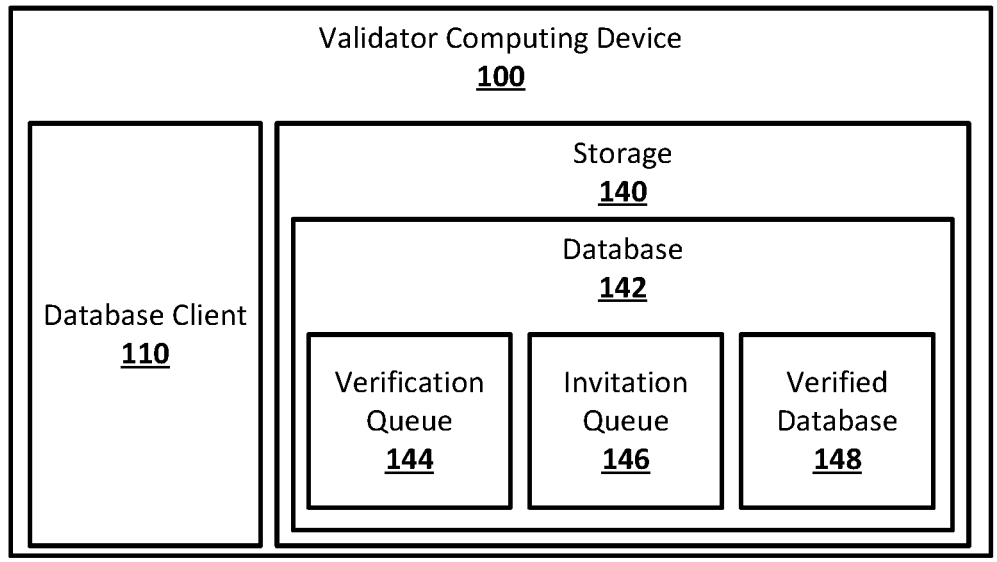
FIG. 1 shows an example system suitable for a decentralized database associating public keys and communications addresses according to an implementation of the disclosed subject matter.

According to embodiments disclosed herein, a decentralized database associating public keys and communications addresses may allow for a database distributed across any number of computing devices to store associations between public keys and communications addresses without requiring a trusted third party and without using communications addresses as public keys. Users of the decentralized database, which may be, for example, people, organizations, or other suitable parties, may generate public/private cryptographic key pairs, including a public key and private key, for themselves. Users may then register their communications address and public key in the decentralized database. The decentralized database may be a public, append-only database. The decentralized database may store tuples that include a communications address and a public key, associating the communications with the public key in the decentralized database. The decentralized database, which may include multiple computing devices and systems controlled by various parties, may verify uploaded public keys and their associated communications addresses before storing them as a tuple. Verification may be performed by computing devices acting as validators for the decentralized database. To verify a public key and communications address, validator computing devices may send a signed secret message to the communications address that a user is seeking to register. To successfully register their public and key and communications address, the user may need to sign the signed secret message using the private key that is part of the public/private encryption key pair with the public key the user is attempting to register along with the communications address. The validators may verify the user-signed secret message using public key the user is attempting to register. Upon successful verification of the user-signed secret message, the validator computing devices may append the secret message, the user-signed secret message, and the validator computing device's own signature to an entry in the decentralized database that includes the tuple with the communications address and public key. This may register the communications address with the decentralized database and associate the public key with the communications address, so that anyone may look up the communications address in the decentralized database to retrieve its associated public key.

The decentralized database may be implemented in any suitable manner, including, for example, as a part of blockchain database stored in a decentralized manner across multiple different computing devices and systems. The decentralized database may be functionally decentralized and logically centralized, so that no single, central party may store, manage, or maintain the decentralized database and all of the entries stored in the decentralized database may be available at all times. The decentralized database may store entries, each of which may include a tuple with a communications address and a public key. The communications address may be any address to which a signed secret message may be sent by a validator computing device. For example, the communications address may be an email address, a phone number, an IP address, a social media service username, a messaging service user name, or a routing and account number for an account at a financial institution. Arbitrary strings may be appended to a communications address to allow for multiple public keys to be associated with the same communications address in the decentralized database, as the same communications address, with a different appended arbitrary string, may be used in multiple entries in the decentralized database. The communications address in a tuple with a public key in an entry of the decentralized database may identify the owner of the private key that is part of a public/private encryption key pair with the public key.

In some implementations, a decentralized database may use a single computing device or system as a validator node. The validator node may maintain the decentralized database, which may be append-only and may store the entries including the tuples that associate a communications address with a public key. The validator node may also maintain verification queue that may include tuples associating addresses with public keys that have been uploaded by users and are waiting to be verified before being written as entries to the decentralized database.

A user may attempt to register a communications address and public key with the decentralized database. The user may generate, using their own user computing device, a public/private encryption key pair. The user computing device may be any suitable computing device, including, for example, a smartphone, tablet, laptop, personal computer, server system, or other computing device to which the user may have access and the ability to generate encryption keys on. The user may then send to the decentralized database the public key from the public/private encryption key pair and the communications address they wish to associate with the public key. The public key and communications address may be added as a pair to the verification queue upon receipt from the user computing device.

The validator node may attempt to verify the public keys and associated communications addresses added to the validation queue by users. The validator node may send a secret message to a communications address from a communications address/public key pair from the verification queue. The secret message may be signed using a private key belonging to the validator node before being sent to the communications address. For example, if the communications address is an email address, the validator node may send the signed secret message in an email to the email address. The validator node may then wait to receive a response from the user that controls the communications address to which the signed secret message was sent.

Upon receiving a signed secret message from a validator node at the communications address, the user computing device may sign the signed secret message using the private key from the public/private encryption key pair for the public key that the user added to the verification queue. The signed secret message may be signed by the user computing device by, for example, encrypting a hash of the signed secret message using the private key. The user-signed secret message may then be sent back to the validator node, for example, as a reply to an email received from the validator node, through the use of a protocol for communication with a peer-to-peer network, for example, for a blockchain, or through the use of an application that allows direct communication with the validator node.

The validator node, upon receiving a user-signed secret message from the user that controls the communications address to which the secret message was sent, may verify the user-signed secret message. The validator node may use the public key that is part of the communications address/public key pair with the communications address in the verification queue to verify the user-signed secret message. This may be the communications address to which the secret message was sent. For example, the validator node may use the public key to verify the signature added by the user computing device to the user-signed secret message by decrypting the signature and comparing the resulting hash to a hash of the secret message that was sent to the communications address. If the verification is successful, for example, when the hash decrypted from the signature of the user-signed secret message with the public key matches the hash of the secret message, the validator node may write an entry to the decentralized database with the communications address/public key pair.

The entry in the decentralized database for the verified communications address/public key pair may include a tuple with the communications address, the public key, the signed secret message, the user-signed secret message, and a signature from the validator node. The public key and communications address may thus be associated in the decentralized database, so that any party with access to the decentralized database may look up the communications address and retrieve the associated public key. The decentralized database may be publicly available.

In some implementations, a decentralized database may use more than one computing device or system as validator nodes in a peer-to-peer network. The peer-to-peer network may permit any computing device or system to join the network as a validator node, and for any computing device or system acting as a validator to leave the network, without requiring permission from any other computing device or system of the peer-to-peer network. Each validator node in the peer-to-peer network may maintain its own full copy of the decentralized database, including an invited user queue, a verification queue, and verified database including entries with all verified communications address/public key pairs. All data in the decentralized database maintained by the validator nodes, including the invited user queue, verification queue, and verified database, may be stored as a blockchain, which may be written in append-only form using blocks of data. The decentralized database may therefore be stored as a blockchain database across any number of computing devices and systems that participate in the peer-to-peer network for the decentralized database. Because the decentralized database may be stored as an append-only blockchain database, the entire history the decentralized database, including the invited user queue, verification queue, and verified database, may always be available.

The invitation queue may be a queue of users that have been invited to add their communications address and public key to the decentralized database. Each entry in the invitation queue may include, for example, a hash of the communications address of the invited user, a hash of the communications address of the inviter, the signature of the inviter, and a timestamp indicating when the invitation was sent to the invited user.

The verification queue may include entries that each include a communications address and public key that were added by a user for verification by the validator nodes and a timestamp indicating when the communications address and public key were added to the verification queue. The communications address in an entry in the verification queue may include an arbitrary string appended to it, for example, to allow for the same communications address to be associated with more than one public key.

The verified database may be a database that include entries with communications address/public key pairs that have been verified by the validator nodes, for example, after having been added to the verification queue. Each entry in the verified database may include, for example, a hash of the communications address and a hash of any arbitrary string that may be appended to the communications address, the public key associated with the communications address, a timestamp indicating when the communications address/public key pair was added to the verification queue, a timestamp indicating when the communications address/public key pair was verified by the validator nodes, the signed secret message that was sent to the communications address, the user-signed secret message that was received from the user that controls communications address, the public key of the validator node that verified the communications address/public key pair, and the signature of that validator node. A hash of the communications address may also be prepended to the signed secret message to tie the signed secret message to the communications address that the signed secret message was used to verify.

A user of the decentralized database, for example, any party that has had a communications address/public key pair verified and stored in the verified database, may send an invitation to another party. An invitation function of the decentralized database may be invoked by a user, for example, from a user computing device. The invocation of the invitation function may include the communications address to which the invitation will be sent, the communications address of the inviter, for example a communications address that is already stored in an entry in the verified database, and the signature of the inviter which may be created, for example, using the private key from the public/private encryption key pair of which the public key is stored in the verified database associated with the communications address.

A user that has been invited to the decentralized database may invoke a verification request function to request verification of their communications address/public key pair. The invocation of the verification request function may include the communications address, the public key, and a signature from the user requesting the verification. The user-signed secret message may be added after the signed secret message from the validator nodes is received at the communications address and signed by the user.

A verification function may be invoked on the decentralized database to verify communications address/public keys pairs from the verification queue. The invocation of the verification function may include a communications address and public key from a pair in the verification queue, the user-signed secret message returned from the user that controls the communications address, the public key of the validator that verified the communications address/public key pair, and that validators signature.

Invocation of the invitation function and the verification request function may be broadcast by a user, from a user computing device, to the computing devices and system of the peer-to-peer network of the decentralized database.

Blocks of the blockchain used to store the decentralized database may be written by validator nodes of the peer-to-peer network. Validator nodes may compete using a proof-of-work based leader election protocol, may use a proof-of-stake leader election protocol, or may be picked using a verifiable random function, or random beacon, to determine which validator node will write the next block of the blockchain. The validator node that is the leader for a block, for example, having won a proof-of-work competition for the block, may invoke the verification function for the current block and for some number of immediately previous blocks of the blockchain. For example, if the validator nodes invoke the verification function for the previous three blocks of the blockchain, the validator node may send signed secret messages to communications addresses in communications address/public key pairs from the verification queue that appear in the current block and the two immediately preceding blocks. The validator node may verify any user-signed secret messages received from the users that control communications addresses to which the signed secret messages are sent, for example, through decrypting user-signed secret messages using public keys from the verification queue. For any communications address/public key pair in the verification queue that are written to the oldest of the three immediately preceding blocks, the validator node may verify that three previous validator nodes successfully verified a user-signed secret message received in response to a signed secret message sent to the communications address and then write the communications address/public key pair to the verified database as part of the block written by the validator node. In some implementations, verifications may be performed in parallel. For example, validator nodes may be selected randomly from validator nodes that wrote some previous number of blocks of the blockchains, such as, for example, the last 1000 validator nodes to write a block. Multiple verification requests may be sent by a user in parallel to multiple validator nodes, which may all response with signed secret messages and verify received user-signed secret messages. The last validator node to verify a user-signed secret message may write the communications address/public key pair to the verified database.

A user of the decentralized database who has a registered communications address/public key pair in the verified database may also have access to add key, revoke key, and change key functions. Invoking the add key function may allow the user to pair an additional public key with the communications address that is already part of the communications address/public key pair in the verified database. The add key function may append an arbitrary string to the communications address, allowing the communications address and arbitrary string to be stored along with the additional public key in a new entry in the verified database without conflicting with the already extant entry that includes the communications address. Invoking the revoke key function may allow a user to revoke a public key that they registered with the decentralized database and that is stored in the verified database, for example, removing the public key from a communications address/public key pair. Invoking the change key function may allow a user to change a public key that they registered with the decentralized database and is stored in the verified database, for example, changing the public key that is part of a communications address/public key pair.

The decentralized database may track account balances for communications addresses that have been verified as part of a communications address/public key pair in the verified database. An account balance for a communications address may track an amount of a resource, such as, for example, a cryptographic token, that is currently associated with the communications address. The decentralized database may include a transactions database, which may store transactions that transfer resources between communications addresses. A transfer function may be invoked by a user of the decentralized database to transfer a quantity of resources, such as an amount of the cryptographic token, from the account balance associated with their communications address to another account balance associated with another communications address. The transfer function may be invoked using the public key of the transferring user, or sender, the public key of the receiving user, or receiver, a hash of the communications address of the receiver, an amount of resources to be transferred, a signature of the sender. When a transfer is verified and written to the transaction database it may include all of the parameters that were included in the invocation of the transfer function, including the public key of the sender, the public key of the receiver, the hash of the communications address of the receiver, the amount to be transferred, and the signature of the sender. The use of communications addresses to transfer cryptographic tokens may simplify transactions compared to the use of public keys as addresses. It may be easier to verify the party to whom cryptographic tokens are being transferred based on their communications address. Further, the decentralized database may allow for the sending of encrypted messages without relying on a centralized third party to provide the public key of the recipient that will be used to encrypt the message sent to that recipient.

The account balances, transfer function, and transaction database may allow for incentives, in the form of resources such as cryptographic tokens, to be provided to validator nodes. For example, a validator node may receive some quantity of resources added to an account balance for a communications address that is in the verified database and is associated with the validator node when the validator node writes a block of the blockchain of the decentralized database. Validator nodes may also collect fees from users of the decentralized database for writing invitations, verifications, and requests for verification generated by users to a block of the blockchain.

Incentives may also be provided to users, for example, for invoking the invitation function to invite other users to the decentralized database. The validator nodes may write transactions to the transaction database that reward users for invoking the invitation function to issue invitations by transferring some quantity of a resource, such as cryptographic token, to the account balances associated with the user's communications addresses.

Incentives may also be provided to every communications address in the verified database through a transfer that occurs at any suitable time, such as when a communications address/public key pair is verified and added to the verified database, or at regular intervals.

A demurrage policy may be used on the decentralized database which may transfer an amount of resources from the account balance associated with communications addresses to, for example, the account balance of a validator node, when the resources aren't transferred out of the account balance associated with the communications addresses due to inactivity of the communications address. For example, the demurrage policy may start at some set amount of time after the account balances are initially created, and on implementation. Some set quantity of resources may be exempt from demurrage, or the amount transferred out using demurrage may be progressive, transferring out smaller amounts of the resource as the account balance decreases. Demurrage may result in the account balance associated with a communications address that is inactive for a long enough period of time becoming zero. Demurrage may encourage more frequent transfers of resources, such as cryptographic tokens.

Incentives provided to users of the decentralized database through transfers to account balances associated with communications addresses may be based on the user's activity with the decentralized database, such as, for example, having a communications address/public key pair verified, invoking the invitation function to invite other users, and transferring resources to the account balances associated with the communications addresses of other users. Having a communications address/public key pair verified may involve a transfer from the account balance of the user to validator nodes, and invoking the invitation function may involve a transfer from the account balance of the user to the account balance of a communications address that has not yet been added to the verified database. An activity score for a user may therefore be measured as the sum of transfers made from the account balance associated with the communications address to the user to the account balances associated with the communications addresses of other users, weighted by the activity scores for the other users. This may make user activity scores recursive in nature. Activity scores may be computed on a payment matrix for the decentralized database using a modified EigenTrust algorithm with verified communications addresses used in place of the pre-trusted peers.

Strings appended to communications addresses may be used to convey additional information. For example, a communications address may have a string appended to it that is a date and may indicate that date at which the public key associated with the communications address and appended string will expire. The appended string may be a name, which may indicate a party to whom access has been granted to the private key that is part of the public/private encryption key pair with the public key associated with the communications address and appended name.

The decentralized database may allow for the verification of phone numbers. A user may use a phone number as their communications address, having a phone number/public key pair verified and added to the verified database. When a third-party application wants to verify the user's phone number, the application may have the user sign a message with their private key. The application may then look up the phone number in the decentralized database and use the public key from the phone number/public key pair in the decentralized database to verify the signed message from the user. If the public key can be used to successfully verify the message signed by the user with their private key, this may verify that the phone number belongs to the user.

The verified database of the decentralized database may allow for contact-list based payments to made using payment applications. For example, a mobile payment application running on a smartphone may be able to use the phone number for a contact from a contact list to look up the public key associated with that phone number in the verified database. Knowledge of the public key associated with the phone number may allow the mobile payment application to make a payment to the contact from the contact list.

The communications address may be a bank account and routing number. A signed secret message sent to a bank account may be, for example, a sequence of deposits of small amounts of money, or may be a message written in the memo field of a deposit made the bank account.

Sensor devices may register communications addresses/public pair keys with the decentralized database. This may allow for a sensor to transmit data signed with the sensor's private key that may be verified by any computing device that may be able to look up the sensor's communications address in the verified database of the decentralized database and retrieve the associated public key without requiring that the sensor send out its public key beyond registering the public key with the decentralized database. Public keys registered by actuator devices may be used to encrypt broadcast messages to actuator devices so that only specific actuator devices may be able to read the broadcast message.

The same public key may be part of a communications address/public key pair with any number of communications addresses. For example, a user may register with the decentralized database the same public key with the user's phone number, the user's email address, and any other additional communications addresses used by the user. This may result in the verified database including multiple communications address/public key pairs with the same public key and different communications addresses.

Communication between the computing devices and systems may occur directly, for example or may be routed in any suitable manner. Communications may occur directly using any suitable communications protocols, such as, for example, HTTPS. In some implementations, instead of messages being sent by one computing device or system to another, a computing device or system may check for a message on another computing device or system. Computing devices and systems may communicate using any suitable communications hardware, including, for example, any suitable wired and wireless network adapters.

FIG. 1 shows an example system suitable for a decentralized database associating public keys and communications addresses according to an implementation of the disclosed subject matter. A validator computing device 100 may include a database client 110 and a storage 140. The validator computing device 100 may be any suitable computing device, such as, for example, a computer 20 as described in FIG. 13, or component thereof, for implementing the database client 110 and the storage 140. The validator computing device 100 may be a single computing device, or may include multiple connected computing devices, and may be, for example, a laptop, a desktop, an individual server, a server farm, or a distributed server system, or may be a virtual computing device or system. The validator computing device 100 may be part of a computing system and network infrastructure, or may be otherwise connected to the computing system and network infrastructure. The validator computing device 100 may be, for example, a computing device or system that serves as a validator node for a decentralized database that includes a verified database of communications addresses associated with public keys. The database client 110 may be any suitable combination of hardware and software on the validator computing device 100 for interacting with and performing functions related to the decentralized database, which may be, for example, a blockchain database stored across multiple computing devices. The storage 140 may be any suitable combination of hardware and software for storing data, including any suitable volatile and non-volatile storage.

The database client 110 may be any suitable combination of hardware and software on the validator computing device 100 for interacting with and performing functions related to the decentralized database. The decentralized database may be a blockchain database. The database client 110 may allow for the validator computing device 100 to interact with, and be a part of, the decentralized database. For example, the database client 110 may maintain a copy of the decentralized database in the storage 140 of the validator computing device 100. Functions implemented by the database client 110 may include, for example, an invitation function used to invite users to register a communications address/public key pair with the decentralized database, and a verification function that may be used to verify communications address/public key pairs, for example, through the sending of a signed secret message to the communications address and verification of a user-signed secret message received in response. The database client 110 may be configured to allow the validator computing device 100 to act as a validator node for the decentralized database. The database client 110 may allow the validator computing device 100 to write blocks of the blockchain of the decentralized database. If the decentralized network includes more than one validator node, the database client 110 may allow the validator computing device 100 to compete in proof-of-work competitions with other validator nodes for the right to write the next block of the blockchain of the decentralized database.

The storage 140 may store a database 142. The database 142 may be, for example, a copy of the blockchain of the decentralized database. The database 142 may be stored as, for example, a series of blocks, and may be append only. The database 142, as stored on the validator computing device 100, may be a complete copy of the blockchain of the decentralized database including all blocks written to the blockchain since its inception. The database 142 may include a verification queue 144, an invitation queue 146, and a verified database 148, which may be stored, for example, as updates across the blocks of the blockchain.

The verification queue 144 may include entries for communications address/public pairs for which a user has requested verification. An entry in the verification queue 144 may be of the form [pending: address, (optional) appended_string, public_key, timestamp_of_verification_request], where "address" may be the communications address, such as, for example, an email address, phone number, IP address, or social media user name, "appended_string" may be an alphanumeric string that may be optionally appended to the "address", "public_key" may be a public key the user wishes to associate with the "address", and "timestamp_of_verification_request" may be an indication of the time the verification request for the "address" and "public_key" was received from the user at, for example, the validator computing device 100.

The invitation queue 146 may include entries for invitations for users to register communications address/public key pairs that have been sent to communications address, for example, by current users of the decentralized database, including, for example, a user associated with the validator computing device 100. An entry in the invitation queue 146 may have the form [invited: hash(invitee_address), hash (inviter_address), signature_of_inviter, invitation_timestamp], where "hash(invitee_address)" may be a hash of the communications address to which the invitation was sent, "hash(inviter_address)" may be a hash of the communications address of the user that sent the invitation, "signature_of_inviter" may be a signature of the user that sent the invitation created using a private key the is part of a public/private encryption key pair with the public key associated with the user's communications address, and "invitation_timestamp" may be an indication of the time the invitation was sent.

The verified database 148 may include entries for communications address/public key pairs that have been registered with the decentralized database, having been verified by validator nodes such as the validator computing device 100. An entry in the verified database 148 may have the form [verified: hash(address), hash(appended_string), public_key, time_stamp_of_verification_request, timestamp_of_verification, secret_message, signed_secret_message, validator_public_key, validator signature], where hash(address) may be a hash of the communications address of the registered communications address/public key pair, hash (appended_string) may be a hash of an alphanumeric string that may be optionally appended to the "address, "public_key" may be the public key that has been associated with the "address" in the registered communications address/public key pair, "time_stamp_of_verification_request" may be an indication of the time the verification request for the "address" and "public_key" was received from the user at, for example, the validator computing device 100, "timestamp_of_verification" may be an indication of the time the communications address/public key pair was successfully verified, for example, by the validator computing device 100, "secret_message" may be the signed secret message sent to the "address" by, for example, the validator computing device 100, "signed_secret_message" may be the result of a user that received the signed secret message applying their private key to the signed secret message, "validator_public_key" may be the public key of the validator node, such as the validator computing device 100, that sent out the signed secret message and verified the user-signed secret message using the "public_key", and "validator signature" may be a signature of the validator node, such as the validator computing device 100, that sent out the signed secret message and verified the user-signed secret message using the "public_key", created using the private key of the validator node.

The entries in the verified database 148 may be searchable by users of the decentralized database and may also be publicly searchable. For example, a search may be performed to find occurrences of a communications address in the verified database 148, with any appending strings, in order to obtain the public keys associated with the communications address in the verified database 148.

Figure 2:
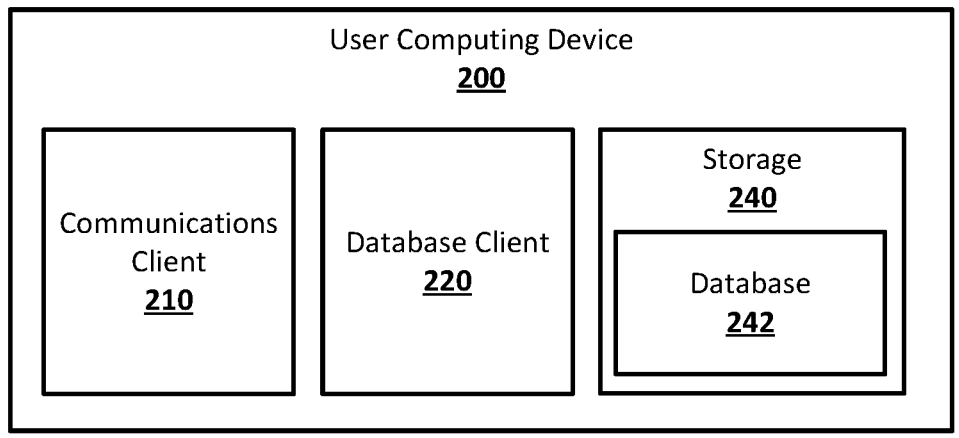
FIG. 2 shows an example system suitable for a decentralized database associating public keys and communications addresses according to an implementation of the disclosed subject matter.

FIG. 2 shows an example system suitable for a decentralized database associating public keys and communications addresses according to an implementation of the disclosed subject matter. A user computing device 200 may include a communications client 210, a database client 220, and a storage 240. The user computing device 200 may be any suitable computing device, such as, for example, a computer 20 as described in FIG. 13, or component thereof, for implementing the communications client 210, database client 220, and a storage 240. The user computing device 200 may be a single computing device, or may include multiple connected computing devices, and may be, for example, a laptop, a desktop, an individual server, a server farm, or a distributed server system, or may be a virtual computing device or system. The user computing device 200 may be part of a computing system and network infrastructure, or may be otherwise connected to the computing system and network infrastructure. The communications client 210 may be any suitable combination of hardware and software on the user computing device 200 for sending and receiving communications with an associated communications address. The database client 220 may be any suitable combination of hardware and software on the user computing device 200 for interacting with and performing functions related to the decentralized database, which may be, for example, a blockchain database stored across multiple computing devices. The database client 220 may be implemented using a copy of the same software application used to implement the database client 110. The user computing device 200 may also include a storage 240 which may store the database 242, which may be a full or partial copy of the decentralized database as stored in the database 142. For example, the database 242 may store only some number of the most recent blocks of the blockchain of the decentralized database, or may store a copy of the entire blockchain. New blocks written to the blockchain, for example, written by the validator computing device 100 to the database 142, may be propagated to the user computing device 200 through the peer-to-peer network of the decentralized database and added to the database 242.

The communications client 210 may be any suitable combination of hardware and software on the user computing device 200 for sending and receiving communications with an associated communications address. The communications client 210 may be, for example, an email client, an SMS client, a messaging client, a social media client, a web browser that may be used to access email, messaging, or social media services, or any other client application that may have an associated communications address and may allow for the sending and receiving of messages.

The database client 220 may be any suitable combination of hardware and software on the user computing device 200 for interacting with and performing functions related to the decentralized database. The decentralized database may be a blockchain database. The database client 220 may allow for the user computing device 200 to interact with, and be a part of, the decentralized database. For example, the database client 220 may maintain a copy of the decentralized database in the storage 240 of the user computing device 200. The copy of the decentralized database may be a full copy or a partial copy. Functions implemented by the database client 220 may include, for example, an invitation function used to invite users to register a communications address/public key pair with the decentralized database, and a verification function that may be used to verify communications address/ public key pairs, for example, through the sending of a signed secret message to the communications address and verification of a user-signed secret message received in response. The database client 220 may be configured so that the user computing device 200 does not act as a validator node for the decentralized database. The user computing device 200 may use the database client 220 to register a communications address/public key pair with the decentralized database, for example, submitting a request for verification to the validator nodes of the decentralized database and responding to a received signed secret message by signing the signed secret message and returning the user-signed secret message.

Figure 3:
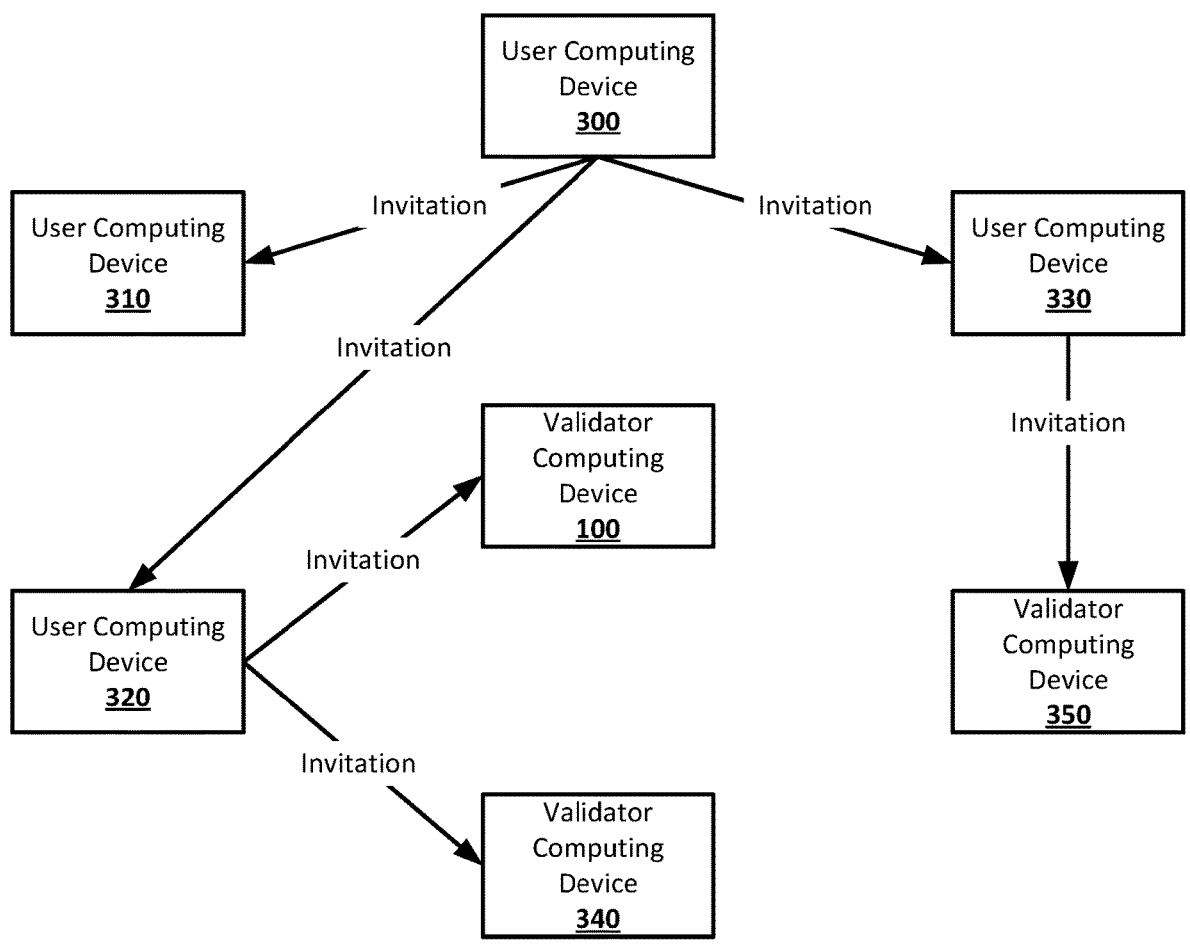
FIG. 3 shows an example arrangement suitable for a decentralized database associating public keys and communications addresses according to an implementation of the disclosed subject matter.

FIG. 3 shows an example arrangement suitable for a decentralized database associating public keys and communications addresses according to an implementation of the disclosed subject matter. A peer-to-peer network for a decentralized database may include several computing devices, including a user computing device 300, user computing device 310, user computing device 320, user computing device 330, the validator computing device 100, validator computing device 340, and validator computing device 350. The user computing devices 300, 310, 320, and 330 may be any suitable computing devices, similar to the user computing device 200. The validator computing devices 340 and 350 may be any suitable computing devices similar to the validator computing device 100, and may, for example, each store a complete copy of the blockchain of the database 142. The computing devices of the peer-to-peer network may each run a database client, such as the database clients 110 and 220.

The user computing device 300 may issue an invitation to a user to join the decentralized database by registering a communications address/public key pair. The invitation may be broadcast from the user computing device 300 to the peer-to-peer network and may be routed among the computing devices of the peer-to-peer network in any suitable manner. For example, the invitation may be broadcast on a best effort basis. The invitation may be broadcast through the invocation of an invitation function of the database client. The function may be invoked as invite(invitee_address, inviter_address, inviter_signature), where "invite_address" may be the communications address of the user being invited, "inviter_address" may be the communications address of the user sending the invitation, for example, a communications address that user interacts with using the user computing device 300, and "inviter_signature" may be a signature of the user sending the invitation using the private key from a public/private encryption key pair whose public key is associated with the user's communications address in the verified database 148 of the decentralized database.

Figure 4:
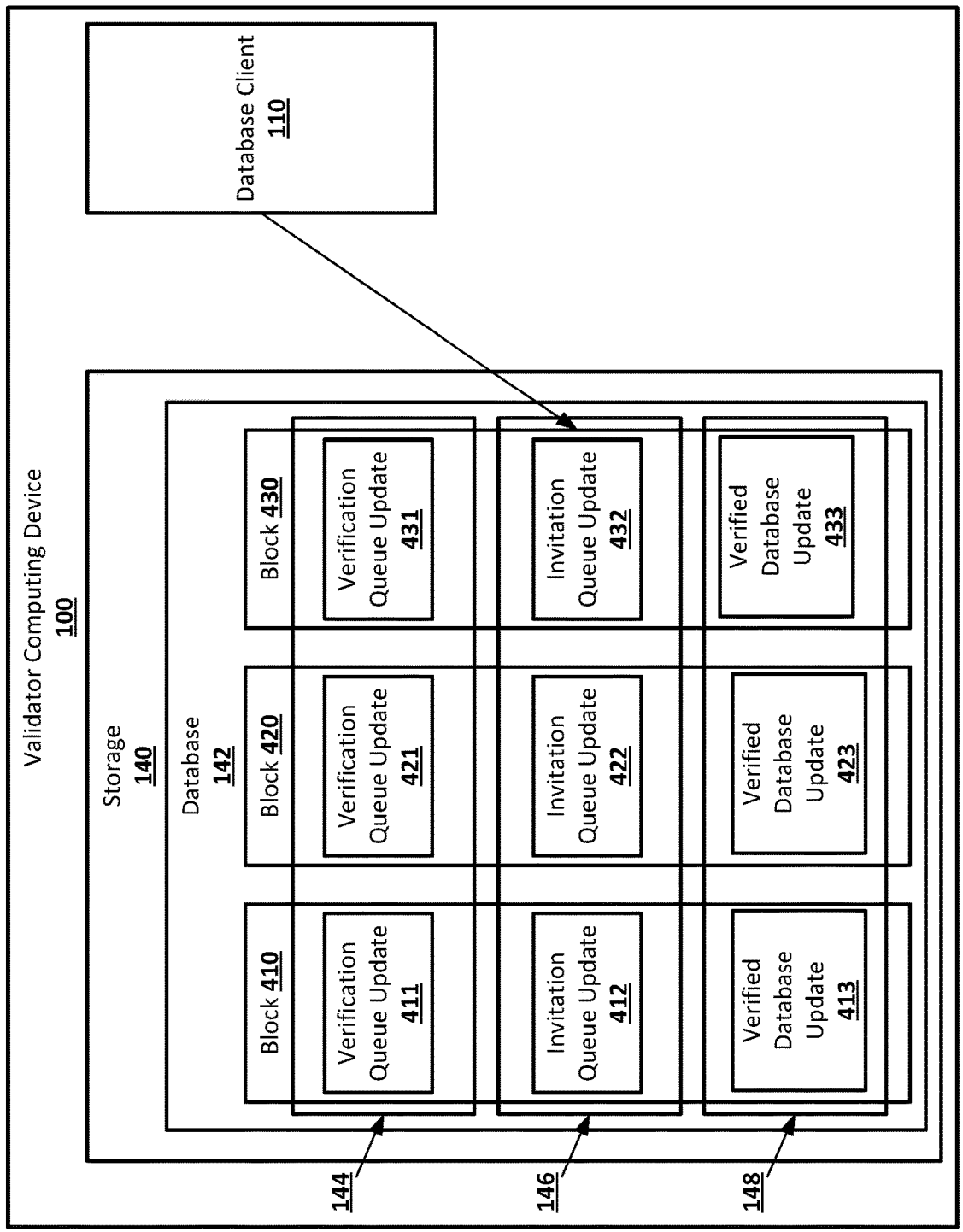
FIG. 4 shows an example arrangement suitable for a decentralized database associating public keys and communications addresses according to an implementation of the disclosed subject matter.

FIG. 4 shows an example arrangement suitable for a decentralized database associating public keys and communications addresses according to an implementation of the disclosed subject matter. The invitation broadcast by the user computing device 300 may be received at the validator computing devices 100, 340, and 350. The validator computing device 100 may be assigned to write the next block of the blockchain for the decentralized database, for example, through winning a proof-of-work competition or through a proof-of-stake assignment. The invitation broadcast by the user computing device 300 may be written to the invitation queue 146 as part of the block written by the database client 110 of the validator computing device 100. The block may be propagated through the peer-to-peer network so that, for example, the validator nodes 340 and 350 may update their copy of the blockchain of the database 142.

For example, the blockchain of the database 142 may include blocks 410, 420, and 430. The block 430 may be written by the database client 110 on the validator node 100 after the validator node 100 has received the invitation broadcast by the user computing device 300. The verification queue 144 may be stored in the form of verification queue updates 411, 421, and 431, which may have been written in the blocks 410, 420, and 430 respectively, and may include updates to the verification queue 144 as of the writing of each block. The invitation queue 146 may be stored in the form of invitation queue updates 412, 422, and 432, which may have been written in the blocks 410, 420, and 430 respectively. The invitation queue update 432 may include, for example, the invitation broadcast by the user computing device 300. The verified database 148 may be stored in the form of verified database updates 413, 423, and 433, which may have been written in the blocks 410, 420, and 430 respectively. In addition to adding the invitation from the user computing device 300 to the invitation queue 146 to the block 430, the validator computing device 100 may also write any changes to the verification queue 144 and verified database 148 to the block 430.

Figure 5:
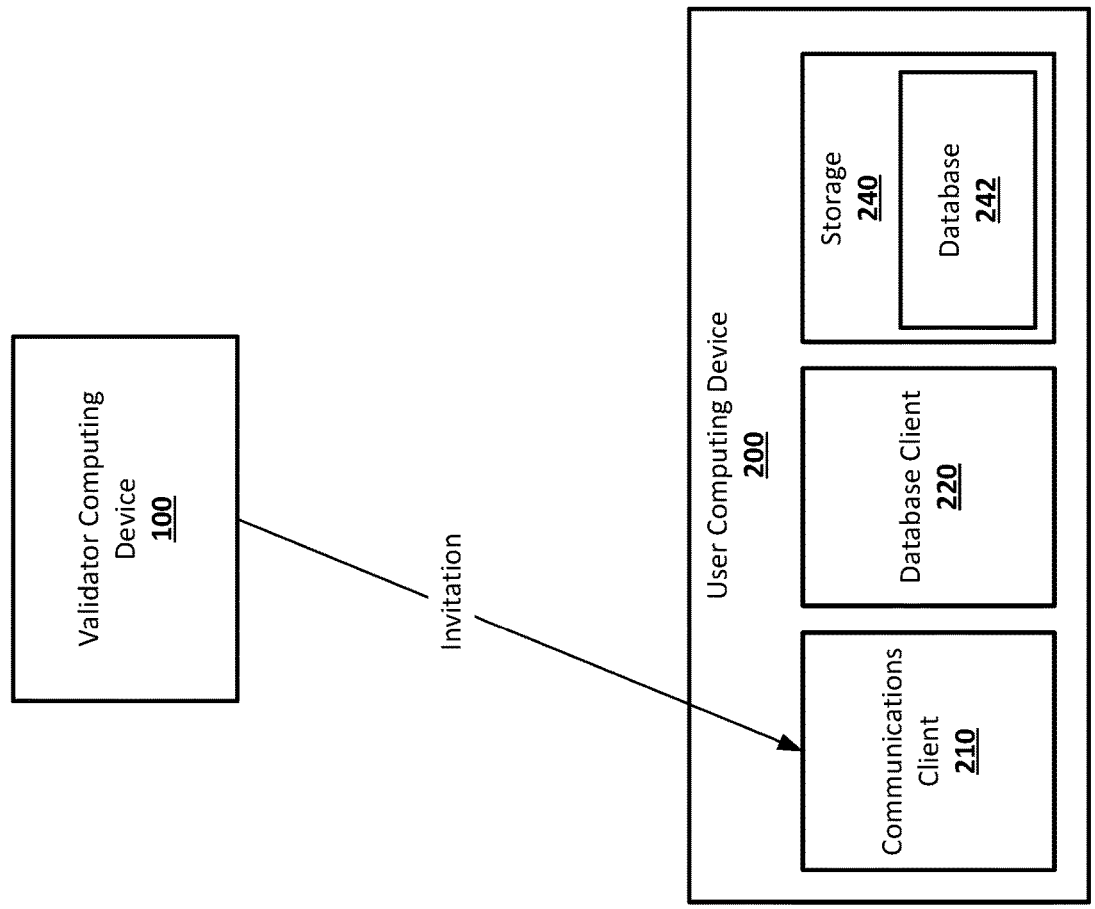
FIG. 5 shows an example arrangement suitable for a decentralized database associating public keys and communications addresses according to an implementation of the disclosed subject matter.

FIG. 5 shows an example arrangement suitable for a decentralized database associating public keys and communications addresses according to an implementation of the disclosed subject matter. The invitation broadcast by the user computing device 300 may be sent to the communications address specified as "invitec_address" in the call invoking the invitation function. For example, the validator computing device 100, or any other computing device of the peer-to-peer network, may read its copy of the verification queue 144 and see the newly written invitation as part of the block 430. The validator computing device 100 may also send the invitation concurrent with writing the block 430. The "invitee_address" may, for example, be a communications address controlled by a user of the user computing device 200. The invitation may be sent directly to the user computing device 200, for example, when the communications address is a phone number and the invitation is sent in the form of an MMS or SMS message, or may be sent indirectly, for example, when the communications address is an email, social media username, messaging application username, or other such address where communications sent to the address are stored on a server system associated with the communications address before being delivered to or retrieved by the user that controls the communications address.

Figure 6:
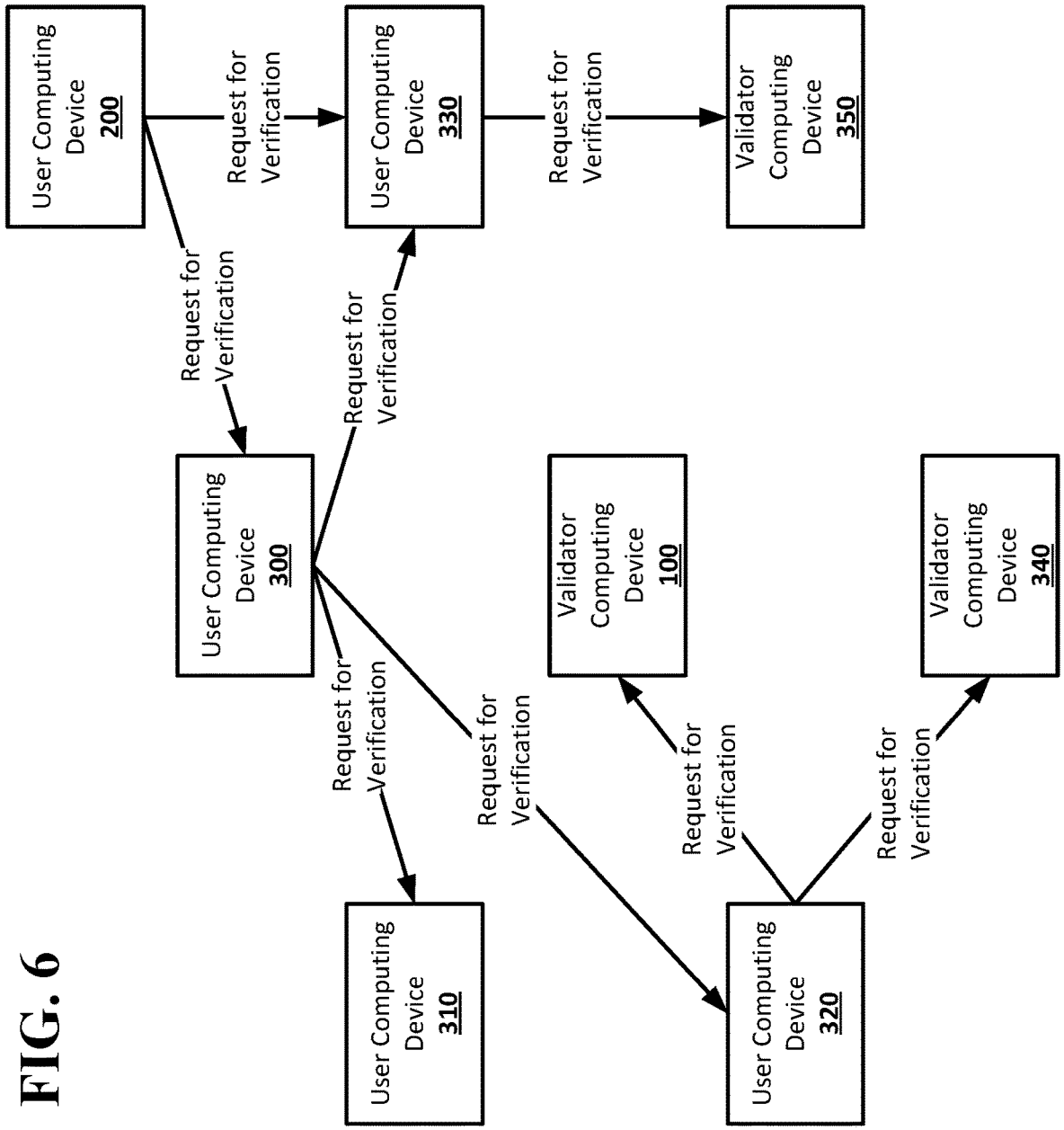
FIG. 6 shows an example arrangement suitable for a decentralized database associating public keys and communications addresses according to an implementation of the disclosed subject matter.

FIG. 6 shows an example arrangement suitable for a decentralized database associating public keys and communications addresses according to an implementation of the disclosed subject matter. A user that receives at a communications address in their control an invitation to register a communications address/public key pair with the decentralized database may respond with a request for verification. The request for verification may be broadcast to the peer-to-peer network, for example, using the database client 220 of the user computing device 200, through the invocation of a verification request function. The function may be invoked as request_verification(address, public_key, requester_signature, ?signed_secret_message), where "address" may be the communications address the user wishes to register with the decentralized database, "public_key" may be the public key that user wishes to register along with the "address" as part of a communications address/public key pair, "requester_signature" may be a signature created by the user with the private key from the public/private encryption key pair that includes the "public_key", and "?signed_secret_message" may be a signed secret message signed with the user's private key, and may be left empty when the initial request for verification is sent as the signed secret message may not yet have been sent.

Figure 7:
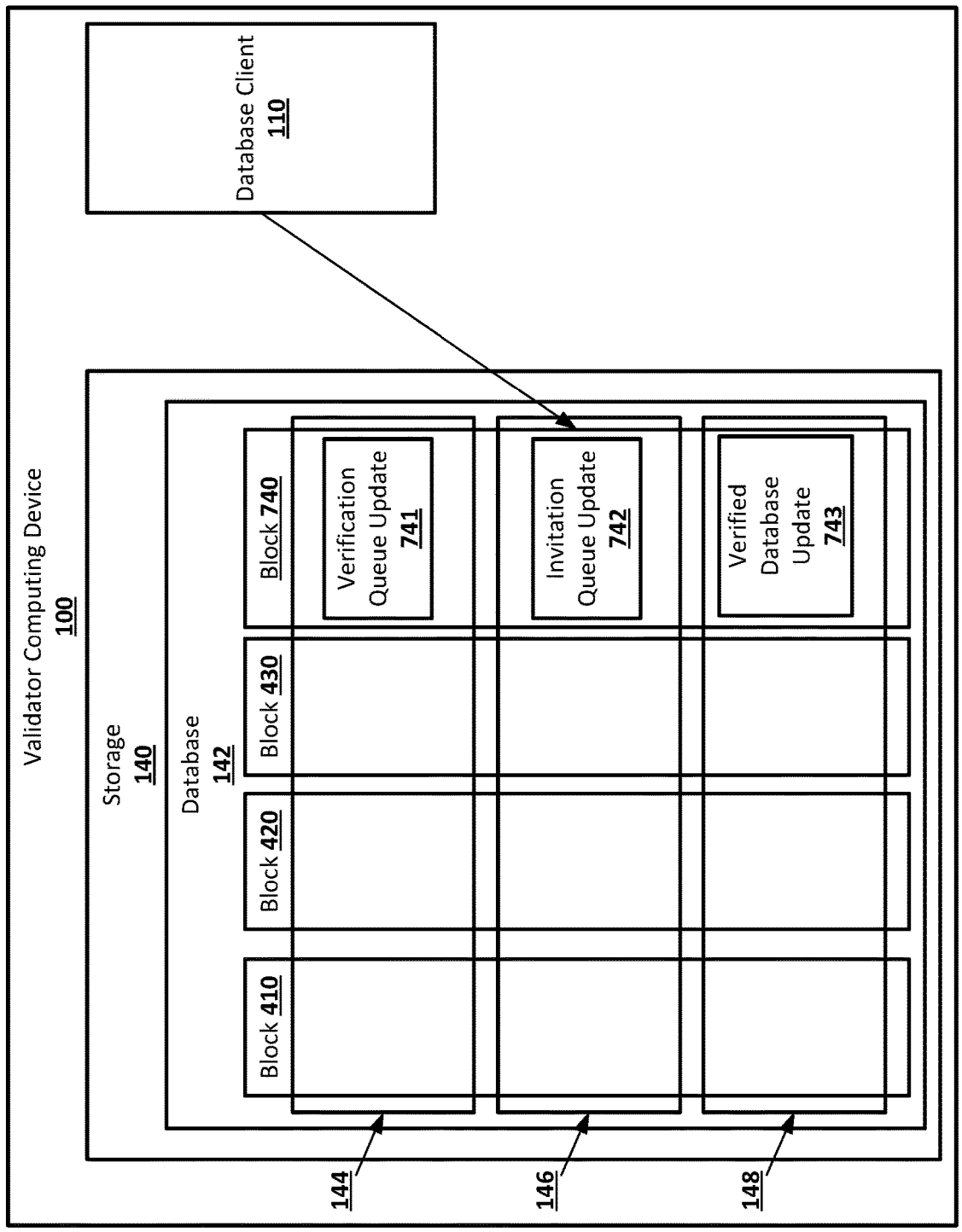
FIG. 7 shows an example arrangement suitable for a decentralized database associating public keys and communications addresses according to an implementation of the disclosed subject matter.

FIG. 7 shows an example arrangement suitable for a decentralized database associating public keys and communications addresses according to an implementation of the disclosed subject matter. The request for verification broadcast by the user computing device 200 may be received at the validator computing devices 100, 340, and 350. The validator computing device 100 may be assigned to write the next block of the blockchain for the decentralized database, for example, through winning a proof-of-work competition or through a proof-of-stake assignment. The request for verification broadcast by the user computing device 200 may be written to the verification queue 144 as part of the block written by the database client 110 of the validator computing device 100. The block may be propagated through the peer-to-peer network so that, for example, the validator nodes 340 and 350 may update their copy of the blockchain of the database 142.

For example, the blockchain of the database 142 may include blocks 410, 420, and 430. The block 740 may be written by the database client 110 on the validator node 100 after the validator node 100 has received the request for verification broadcast by the user computing device 200. The verification queue 144 may be updated with verification queue update 741, which may include the request for verification broadcast by the user computing device 200. In addition to adding the request for verification from the user computing device 200 to the verification queue 144 in the block 740, the validator computing device 100 may also write any changes to the invitation queue 146 and verified database 148 to the block 740 in invitation queue update 742 and verified database update 743.

Figure 8:
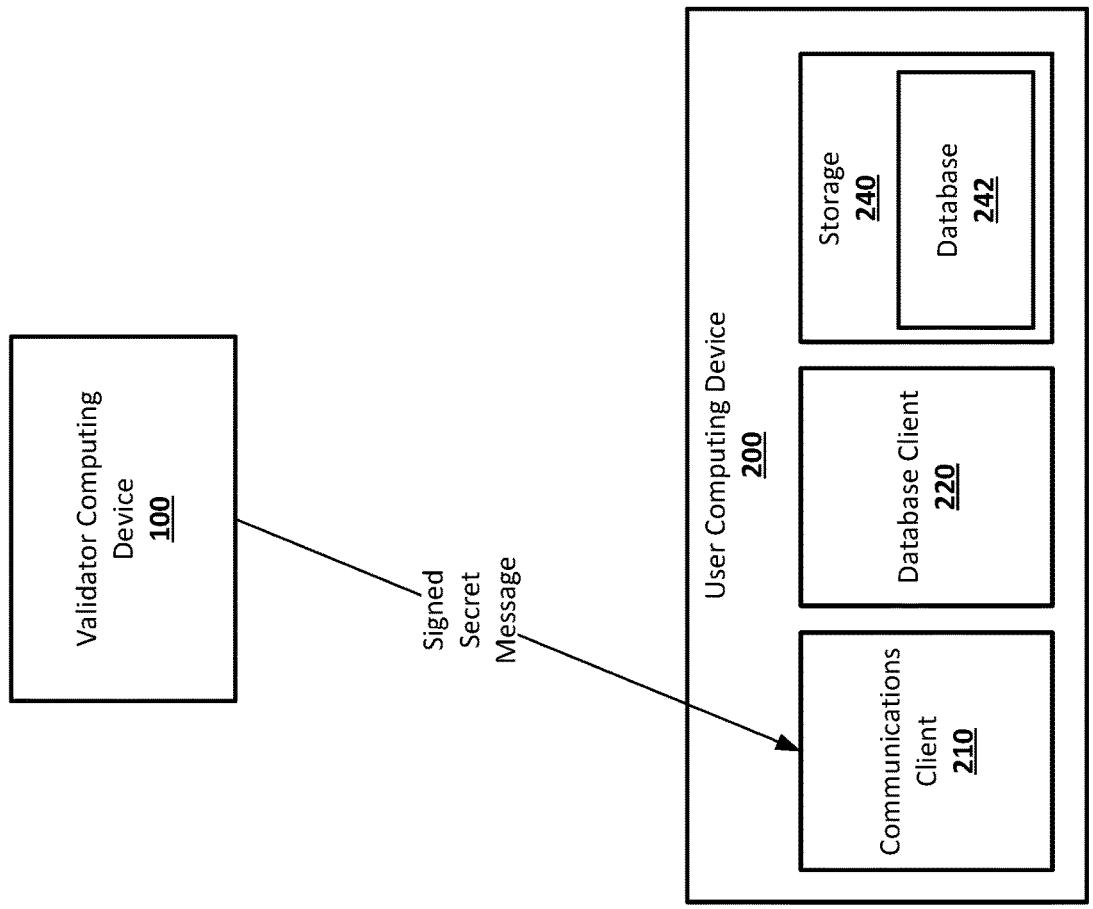
FIG. 8 shows an example arrangement suitable for a decentralized database associating public keys and communications addresses according to an implementation of the disclosed subject matter.

FIG. 8 shows an example arrangement suitable for a decentralized database associating public keys and communications addresses according to an implementation of the disclosed subject matter. A signed secret message may be sent to the communications address to which the invitation was sent after a request for verification is received that includes that communications address as the "address." For example, the validator computing device 100, which wrote the request for verification to the block 740 of the blockchain for the decentralized database, may send a signed secret message to the communications to the "address" specified in the request for verification. The "address" in the request for verification may be the communications address controlled by the user of the user computing device 200, and may be received using, for example, the communications client 210. The signed secret message may be sent directly to the user computing device 200, for example, when the communications address is a phone number and the invitation is sent in the form of an MMS or SMS message, or may be sent indirectly, for example, when the communications address is an email, social media username, messaging application username, or other such address where communications sent to the address are stored on a server system associated with the communications address before being delivered to or retrieved by the user that controls the communications address. The signed secret message may be in any suitable form and may only be known to the validator computing device 100 before being sent to the communications address.

Figure 9:
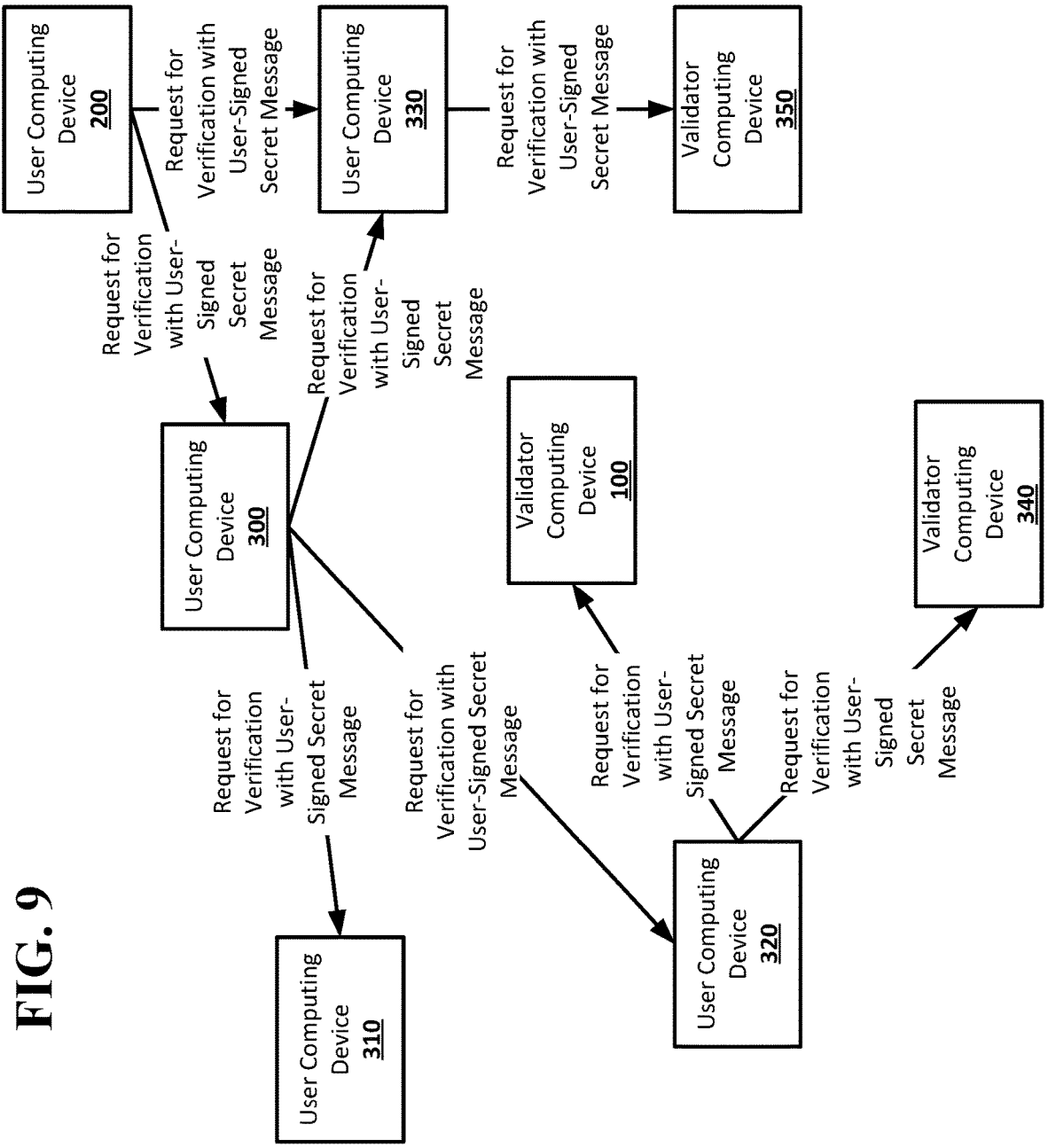
FIG. 9 shows an example arrangement suitable for a decentralized database associating public keys and communications addresses according to an implementation of the disclosed subject matter.

FIG. 9 shows an example arrangement suitable for a decentralized database associating public keys and communications addresses according to an implementation of the disclosed subject matter. A user that receives at a communications address in their control a signed secret message in response to a request for verification may respond with another request for verification that includes a user-signed secret message. For example a user may sign a received signed secret message using any suitable application the user computing device 200 by encrypting the signed secret message with a private key that is part of a public/private key encryption pair with the public key that was used as the "public_key" in the request for verification broadcast by the user computing device 200 to the peer-to-peer network. The user-signed secret message may then be broadcast, along with the other parameters of a request for verification, to the peer-to-peer network.

Figure 10:
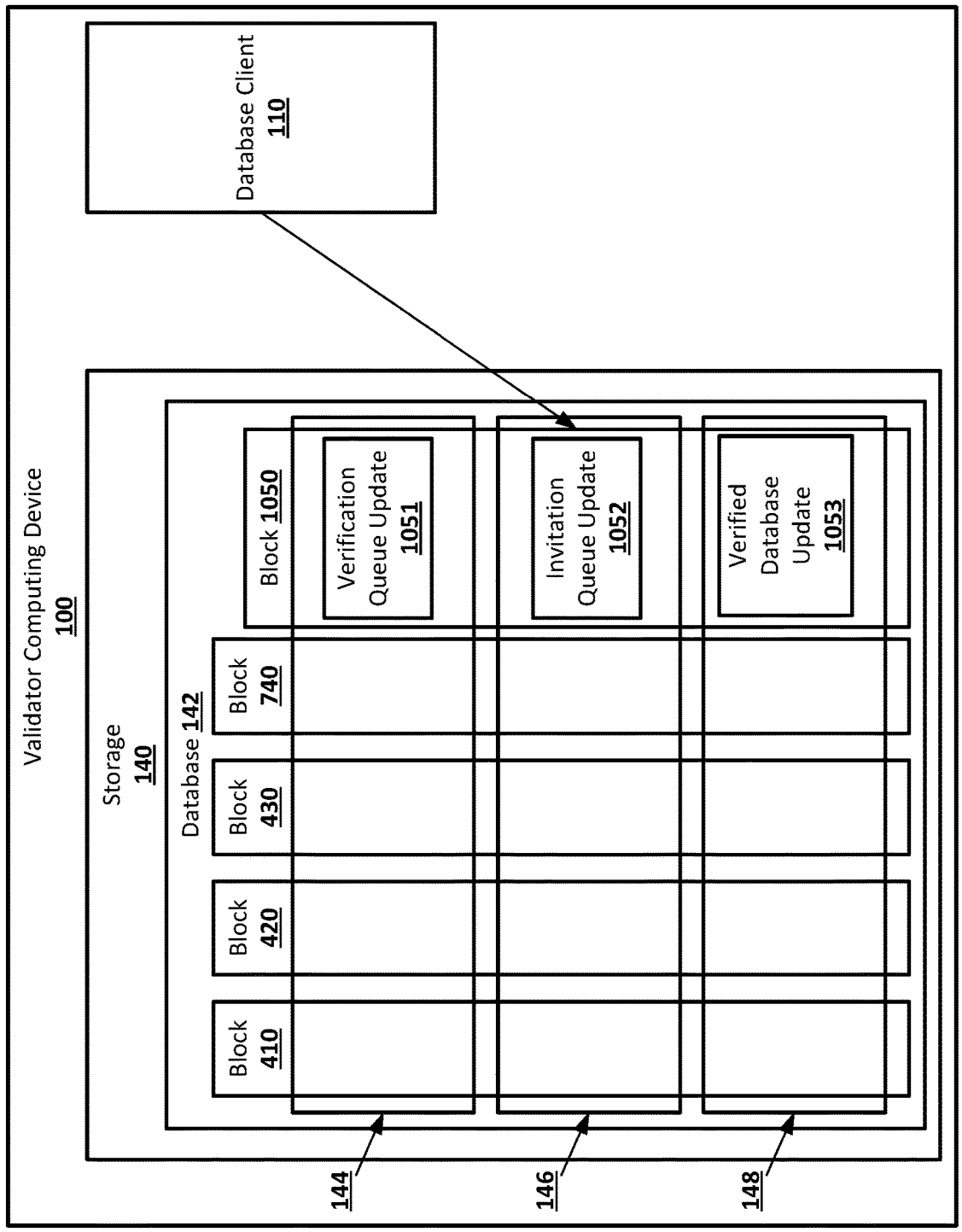
FIG. 10 shows an example arrangement suitable for a decentralized database associating public keys and communications addresses according to an implementation of the disclosed subject matter.

The request for verification may be broadcast to the peer-to-peer network, for example, using the database client 220 of the user computing device 200 through the invocation of a verification request function. The function may be invoked as request_verification(address, public_key, requester_signature, ?signed_secret_message), where "address" may be the communications address the user wishes to register with the decentralized database, and the communications address to which the signed secret message was sent, "public_key" may be the public key that user wishes to register along with the "address" as part of a communications address/public key pair, "requester_signature" may be the signature created by the user with the private key from the public/private encryption key pair that includes the "public_key", and "?signed_secret_message" may be the signed secret message that was received at the communications address after it is signed with the user's private key FIG. 10 shows an example arrangement suitable for a decentralized database associating public keys and communications addresses according to an implementation of the disclosed subject matter. The request for verification broadcast by the user computing device 200 and including the user-signed secret message may be received at the validator computing devices 100, 340, and 350. The validator computing device 100, which sent the signed secret message, may verify the user-signed secret message. For example, the database client 110 of the validator computing device 100 may use the public key from the request for verification to decrypt the user-signed secret message included in the request for verification. If the result decrypting the user-signed secret message in this manner is equal to the signed secret message that was sent to the communications address that is the "address" in the request for verification, the user-signed secret message may be verified. The database client 110 may invoke a verify function to indicate the successful verification of the user-signed secret message, and the communications address/public key pair in the request for verification. The function may be invoked as verify(address, public_key, signed_secret_message, validator_public_key, validator_signature).

The validator computing device 100 may be assigned to write the next block of the blockchain for the decentralized database, for example, through winning a proof-of-work competition or through a proof-of-stake assignment. The request for verification broadcast by the user computing device 200 and including the user-signed secret message verified by the validator computing device 100, may be written to the verification queue 144 as part of the block written by the database client 110 of the validator computing device 100. The block may be propagated through the peer-to-peer network so that, for example, the validator nodes 340 and 350 may update their copy of the blockchain of the database 142.

For example, the blockchain of the database 142 may include blocks 410, 420, 430, and 740. The block 1050 may be written by the database client 110 on the validator node 100 after the validator node 100 has received the request for verification broadcast by the user computing device 200 and verified the user-signed secret message. The verification queue 144 may be updated with verification queue update 1051, which may include the request for verification broadcast by the user computing device 200 including the user-signed secret message. In addition to adding the request for verification from the user computing device 200 to the verification queue 144 in the block 1050, the validator computing device 100 may also write any changes to the invitation queue 146 and verified database 148 to the block 740 in invitation queue update 1052 and verified database update 1053.

The decentralized database may use some threshold number of times that a user-signed secret message must be successfully verified for the same communications address before the communications address and associated public key are registered and written to the verified database 148. This may reduce the probability that a user may collude with validator nodes. For example, the decentralized database may require that three separate user-signed secret messages from three separate validator nodes to be verified for the same communications address before registering the communications address/public key pair for that communications address. Before writing the block, the validator computing device 100 may check the verification queue 144 to determine how many time the request for verification from has been written to the verification queue 144 with a user-signed secret message, indicating the number of times a signed secret message sent to the communications address was returned with a user-signed secret message that was successfully verified by one of the validator computing devices 100, 340, and 350. For example, the request for verification for the communications address that includes a user-signed secret message may not be written to the verification queue in any of the blocks 410, 420, 430, and 740. This may indicate that the request for verification with the included user-signed secret message received by the validator computing device 100 is the first verification of a user-signed secret message for the communications address.

The next validator node to write a block to the blockchain of the decentralized database may send a signed secret message to the communications address, as well as to any other communications address with fewer than the threshold number of entries in the verification queue 144 that include a user-signed secret message. For example, if the validator computing device 350 writes the block that follows the block 105, the validator computing device 350 may send a signed secret message to the communications address that the validator computing device 100 previously sent a signed secret message to and verified a user-signed secret message from. The validator computing device 350 may then validate a user-signed secret message received as part of a request for verification broadcasted from the user computing device 200 in response to receiving the signed secret message from the validator computing device 350. If successfully verified, the validator computing device may write the request for verification including the user-signed secret message in the next block written to the blockchain, updating the verification queue 144. In some implementations, verifications may be performed in parallel. For example, validator nodes may be picked at random from some number of validator nodes that previously wrote a block of the database 142. The user computing device 200 may send out multiple requests for verification in parallel, and then may send out user-signed secret messages upon receiving signed secret messages from any of the randomly selected validator nodes.

If the threshold for registering a communications address/public key pair with the decentralized database is three successful verifications of a user-signed secret message based on a signed secret message sent to the communications address, then a subsequent verification of a user-signed secret message for the communications address by a validator node, such as the validator computing device 340, may result in the communications address/public key pair being written in the next block to the verified database 148. The entry in the verified database 148 may include, for example, the a hash of the communications address and any appended string, the public key, the signed secret messages that were used to verify the communications address and the user-signed secret messages that were returned in response, and the public keys and signatures of the validator nodes that sent the signed secret messages and validated the user-signed secret messages.

Figure 11:
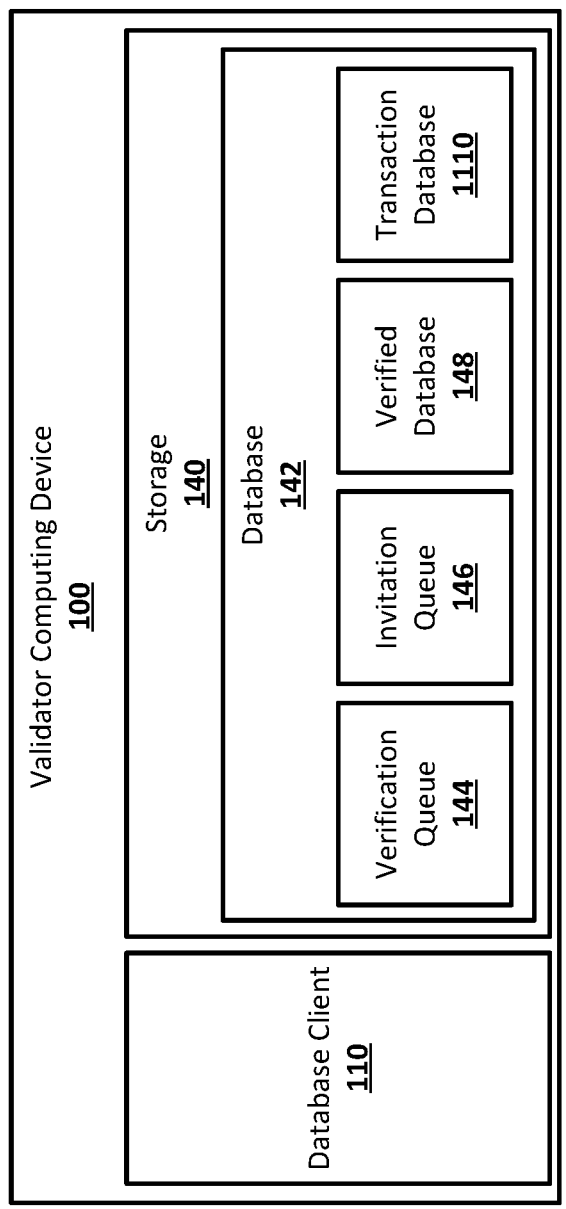
FIG. 11 shows an example system suitable for a decentralized database associating public keys and communications addresses according to an implementation of the disclosed subject matter.

FIG. 11 shows an example system suitable for a decentralized database associating public keys and communications addresses according to an implementation of the disclosed subject matter. In some implementations, each entry for a communications address in the verified database 148 may also include an account balance for a resource, such as a cryptocurrency token. Transactions on the decentralized database may allow for transfers of the resource between account balances in the decentralized database. The transactions may be tracked in a transaction database 1110, which may be part of the database 142, and copies of which may be stored across the computing devise in the peer-to-peer network of the decentralized database.

The transaction database 146 may include entries for transfers between account balances of communications address/public key pairs that are registered in the verified database 148. An entry in the transaction database 1110 may have the form [public_key_of_sender, public_key_of_receiver, hash(address_receiver), amount, sender_signature], where "public_key_of_sender" may be the public key that is part of the communications address/public key pair for which the account balance is being debited in the transfer, public_key_of_receiver may be the public key that is part of the communications address/public key pair for which the account balance is being credited in the transfer, "hash (address_receiver)" may be a hash of the communications address whose associated account balance is being credit in the transfer, "amount" may be the amount of the resource, for example, amount of cryptocurrency being transferred between the account balances, and "sender_signature" may be a signature created using the private key that is part of a public/private encryption key pair with the public key that is the "public_key_of_sender."

Transfers made on the decentralized database and tracked in the transaction database 1110 may be used to assign activity scores to users of the decentralized database. An activity score for a user may be determined as $a\_i = \Sigma\_{(j \in J)} [payment(i, j) * a\_j]$, where $a_i$ may be the activity score for a user i, for example, with a registered communications address, and where the summation is of all payments, or transfers, made from the user i to any other users j ∈ J of the decentralized database, where J may be the set of all users to which user i has made a payment, where each payment is weighted by the activity score of the user j to which the payment, or transfer, was made. The activity score may be used, for example, to distribute additional amount of the resource, such as the cryptocurrency, to account balances associated with communications addresses based on the activity level on the decentralized database of the users to whom the communications addresses belong.

The activity score calculation may be recursive, and may converge if the payment graph is irreducible and aperiodic and its L1 norm equals one, in which case the activity score may converge to the left principal eigenvector of the payment matrix P^T, which may be the stationary distribution of the ergodic Markov chain defined by the payment graph. The payment matric P^T may be defined as $p\_ij = (1-c) * \{sum\_transactions[(payment(j, i)^\gamma * e^{-\lambda t}]/sum\_j (sum\_transactions [(payment(j,i)^\gamma \lambda * e^{-\lambda t}])\} + c*1/|j|$ where payment(j, i) may be a payment made from j to i, γ may be a payment scaling constant between 0 and 1, λ may be non-negative time decay constant, t may be a time since the payment, and c*1/|j| may be a regularization constant that may ensure that the payment matrix P is irreducible and aperiodic. An activity score may be calculated using the payment matrix P using a modified Eigen Trust algorithm that replaces pre-trusted peers with verified peers.

Figure 12:
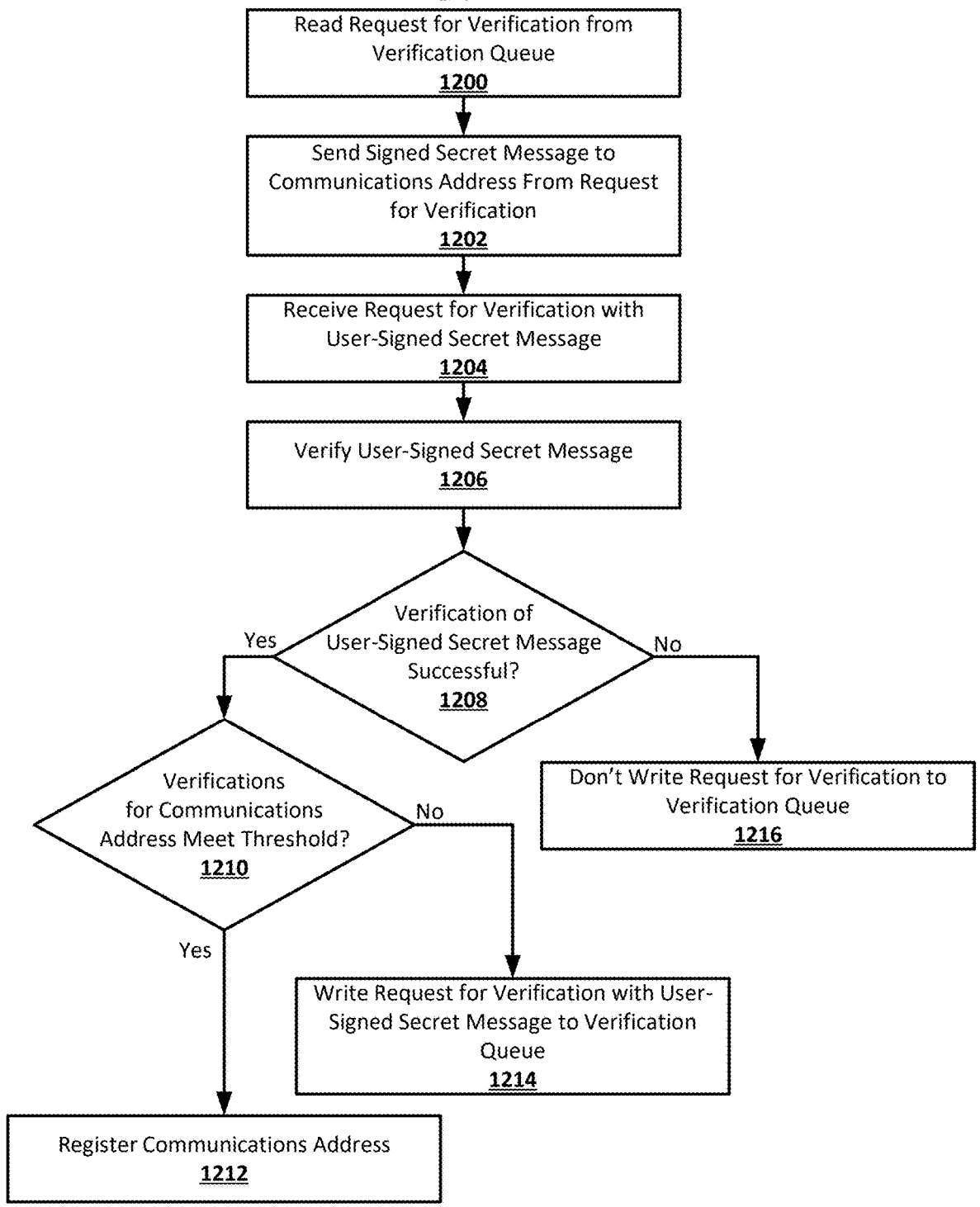
FIG. 12 shows an example procedure suitable for a decentralized database associating public keys and communications addresses according to an implementation of the disclosed subject matter.

FIG. 12 shows an example procedure suitable for a decentralized database associating public keys and communications addresses according to an implementation of the disclosed subject matter. At 1200, a request for verification may be read from a verification queue. For example, the user computing device 200 may have broadcast a request for verification that may have been written to the verification queue 144 in a block of the blockchain for the decentralized database, a copy of which may be stored as the database 142 on the validator computing device 100. The validator computing device 100 may win a proof-of-work competition or be assigned according to proof-of-stake to write the next block of the blockchain. The validator computing device 100 may read pending request for verification from the verification queue 144, including a request for verification broadcast by the user computing device 200.

At 1202, a signed secret message may be sent to a communications address from the request for verification. For example, the validator computing device 100 may send a signed secret message to a communications address that was included in the request for verification broadcast by the user computing device 200. The communications address may be, for example, an email address to which the validator computing device 100 may send an email including the signed secret message. The signed secret message may be known only to the validator computing device 100 upon being sent to the communications address from the request for verification.

At 1204, a request for verification with a user-signed secret message may be received. For example, in response to receiving the signed secret message at the communications address, the user computing device 200 may be used to broadcast another request for verification for that communications address including a user-signed secret message. The user-signed secret message may be, for example, the result of the user computing device 200 encrypting the signed secret message received at the communications address from the validator computing device 100 with the private key that is part of a public/private encryption key pair with the public key that was part of the request for verification with the communications address. The request for verification, including the user-signed secret message, may be received by the validator computing device 100.

At 1206, the user-signed secret message may be verified. For example, the validator computing device 100 may use the public key from the request for verification broadcast by the user computing device 200 to decrypt the signature added by the user to the user-signed secret message. If the result of decrypting the signature of the user-signed secret message matches a hash of the signed secret message that was sent by the validator computing device 100 to the communications address in the request for verification, the user-signed secret message may be verified by the validator computing device 100. This may indicate that the user that controls the communications address from the request for verification also controls the private key that is part of a public/private encryption key pair with the public key from the request for verification. If the results of decrypting the signature of the user-signed secret message do not match the hash of the signed secret message, the verification may fail.

At 1208, if the verification of the user-signed secret message was successful, flow may proceed to 1210. Otherwise, flow may proceed to 1216.

At 1210, if the number of times a request for verification for the communications address has had a user-signed secret message verified meets a threshold number, flow may proceed to 1212, where the communications address may be registered. Otherwise, flow may proceed to 1214, where the request for verification with user-signed secret message may be written to the verification queue. For example, the validator computing device 100, after verifying the user-signed secret message in the request for verification for the communications address, may check the verification queue to determine the number of times a user-signed secret message has been verified for communications address, as each successful verification may be written as an entry in the verification queue 144.

At 1212, the communications address may be registered in the verified database. For example, the verification queue 144 may include more than a threshold number of entries indicating that a user-signed secret message based on a signed secret message sent to the communications address was successfully verified. For example, if the threshold is three verifications, three separate validator nodes, such as the validator computing devices 100, 340, and 350, may have sent three separate signed secret messages to the communications address. Three separate requests for verification including three separate user-signed secret messages based on the received three signed secret messages may have been received by the validator nodes and the user-signed secret messages may have been successfully verified. The first two successful verification may be written as entries to the verification queue 144, for example, in the two preceding blocks of the blockchain of the decentralized database written by two other validator nodes. On verifying a user-signed secret message for communications address for a third time, the validator computing device 100 may write the communications address/public key pair from the request for verification as an entry in the verified database 148 when the validator computing device 100 writes the next block of the blockchain. This may register the communications address with the decentralized database, where it may be looked up to retrieve its associated public key. The entry in the verified database 148 may include a hash of the communications address rather than plain text of the communications address. The third request for verification, with the successfully verified user-signed secret message, may also be written to the verification queue 144, or all requests for verification for the now-registered communications address may be removed from the verification queue 144 so that they do not appear current in the append-only database.

At 1214, the request for verification with successfully verified signed secret message may be written to the verification queue. For example, the validator computing device 100 may write the request for verification, along with the successfully verified signed secret message, to the verification queue 144 when the validator node 100 write the next block of the blockchain. The next validator node to write a block of the blockchain may then read the request for verification from the verification queue 144 when determining whether the communications address has reached the threshold number of requests for verification with successfully verified user-signed secret messages.

At 1216, the request for verification may not be written to the verification queue. For example, the verification of the user-signed secret message may have failed. The request for verification with the user-signed secret message that failed verification may not be written by the validator computing device 100 to the next block of the blockchain.

Figure 13:
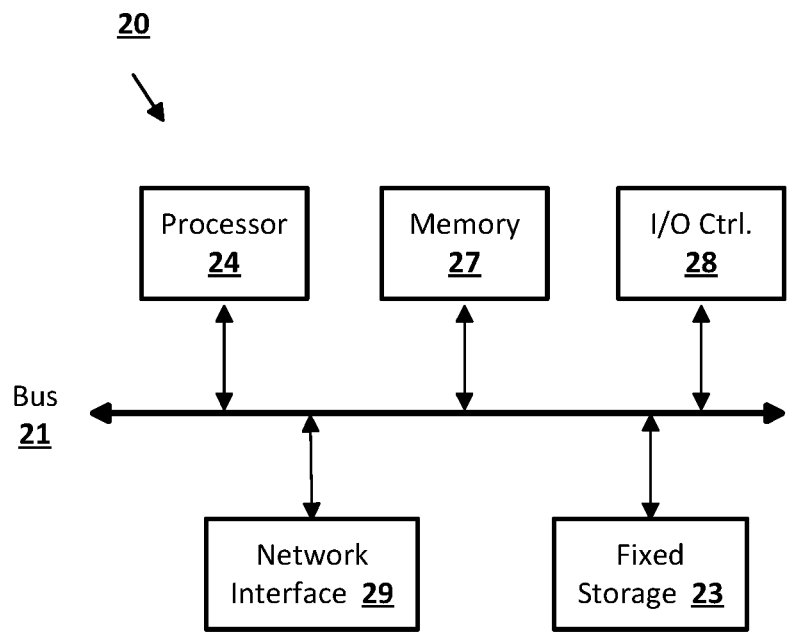
FIG. 13 shows a computer according to an embodiment of the disclosed subject matter.

Embodiments of the presently disclosed subject matter may be implemented in and used with a variety of component and network architectures. FIG. 13 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 14.

Many other devices or components (not shown) may be connected in a similar manner, such as document scanners, digital cameras, auxiliary, supplemental, or backup systems, or the like. Conversely, all of the components shown in FIG. 13 need not be present to practice the present disclosure. The components can be interconnected in different ways from that shown. The operation of a computer such as that shown in FIG. 13 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 14:
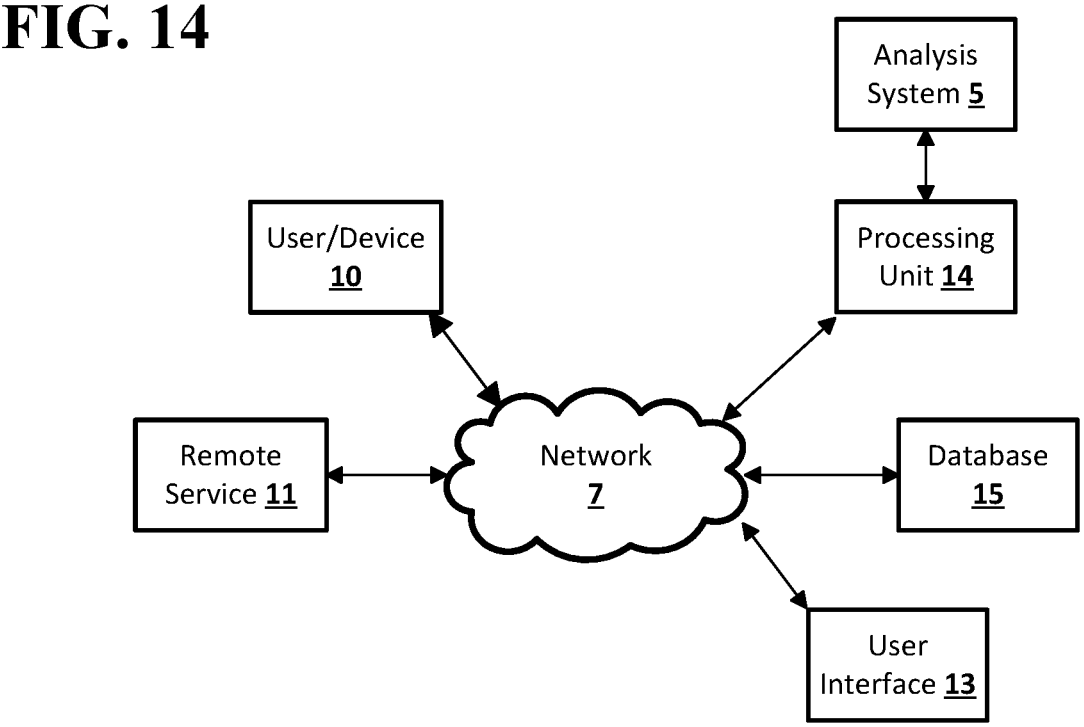
FIG. 14 shows a network configuration according to an embodiment of the disclosed subject matter.

FIG. 14 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed on a data processing apparatus comprising:
  sending, by a user computing device, a request for verification comprising a communications address and a public key;
  receiving, by the user computing device from a validator computing device of a peer-to-peer network for a decentralized database, a signed secret message sent to the communications address;

generating, by the user computing device, a user-signed secret message by signing the signed secret message with a private key that corresponds to the public key; and sending, by the user computing device, the user-signed secret message to the validator computing device.

2. The method of claim 1, wherein the signed secret message is signed using a private key of the validator node.

3. The method of claim 1, wherein generating, by the user computer computing device, a user-signed secret message by signing the signed secret message with a private key that corresponds to the public key further comprises encrypting a hash of the signed secret message using the private key.

4. The method of claim 1, sending, by the user computing device, the user-signed secret message to the validator computing device, further comprises broadcasting the user-signed secret message to computing devices of the peer-to-peer network.

5. The method of claim 1, further comprising:
receiving, by the user computing device from a second validator computing device of the peer-to-peer network for the decentralized database, a second signed secret message sent to the communications address;

generating, by the user computing device, a second user-signed secret message by signing the second signed secret message with the private key that corresponds to the public key; and sending, by the user computing device, the second user-signed secret message to the second validator computing device.

6. The method of claim 5, wherein sending, by the user computing device, the second user-signed secret message to the second validator computing device, further comprises broadcasting the second user-signed secret message to computing devices of the peer-to-peer network.

7. The method of claim 1, wherein the communications address is an email address, a phone number, a social media service username, a messaging service user name, or a bank account and routing number.

8. A computer-implemented system comprising:
a processor of a user computing device that sends a request for verification comprising a communications address and a public key, receives from a validator computing device of a peer-to-peer network for a decentralized database, a signed secret message sent to the communications address, generates a user-signed secret message by signing the signed secret message with a private key that corresponds to the public key, and sends the user-signed secret message to the validator computing device.

9. The system of claim 8, wherein the signed secret message is signed using a private key of the validator node.

10. The system of claim 8, wherein the processor of the user computing device generates the user-signed secret message by signing the signed secret message with a private key that corresponds to the public key by encrypting a hash of the signed secret message using the private key.

11. The system of claim 8, wherein the processor of the user computing device sends the user-signed secret message to the validator computing device by broadcasting the user-signed secret message to computing devices of the peer-to-peer network.

12. The system of claim 8, wherein the processor of the user computing device further receives, from a second validator computing device of the peer-to-peer network for the decentralized database, a second signed secret message sent to the communications address, generates a second user-signed secret message by signing the second signed secret message with the private key that corresponds to the public key, and sends the second user-signed secret message to the second validator computing device.

13. The system of claim 12, wherein the processor of the user computing device sends the second user-signed secret message to the second validator computing device, further comprises broadcasting the second user-signed secret message to computing devices of the peer-to-peer network.

14. The system of claim 10, wherein the communications address is an email address, a phone number, a social media service username, a messaging service user name, or a bank account and routing number.

15. A system comprising: one or more computers and one or more storage devices storing instructions which are operable, when executed by the one or more computers, to cause the one or more computers to perform operations comprising sending, by a user computing device, a request for verification comprising a communications address and a public key;

receiving, by the user computing device from a validator computing device of a peer-to-peer network for a decentralized database, a signed secret message sent to the communications address;

generating, by the user computing device, a user-signed secret message by signing the signed secret message with a private key that corresponds to the public key; and sending, by the user computing device, the user-signed secret message to the validator computing device.

16. The system of claim 15, wherein the signed secret message is signed using a private key of the validator node.

17. The system of claim 15, wherein the instructions which are operable, when executed by the one or more computers, to cause the one or more computers to perform operations comprising generating, by the user computer computing device, a user-signed secret message by signing the signed secret message with a private key that corresponds to the public key further cause the one or more computers to perform operations comprising encrypting a hash of the signed secret message using the private key.

18. The system of claim 15, wherein the instructions which are operable, when executed by the one or more computers, to cause the one or more computers to perform operations comprising sending, by the user computing device, the user-signed secret message to the validator computing device, further cause the one or more computers to perform operations comprising broadcasting the user-signed secret message to computing devices of the peer-to-peer network.

19. The system of claim 15, wherein the instructions are operable, when executed by the one or more computers, to further cause the one or more computers to perform operations comprising:

receiving, by the user computing device from a second validator computing device of the peer-to-peer network for the decentralized database, a second signed secret message sent to the communications address;

generating, by the user computing device, a second user-signed secret message by signing the second signed secret message with the private key that corresponds to the public key; and sending, by the user computing device, the second user-signed secret message to the second validator computing device.

20. The system of claim 19, wherein the instructions which are operable, when executed by the one or more computers, to cause the one or more computers to perform operations comprising sending, by the user computing device, the second user-signed secret message to the second validator computing device, further cause the one or more computers to perform operations comprising broadcasting the second user-signed secret message to computing devices of the peer-to-peer network.

* * * * *